(12) United States Patent
Cheng

(10) Patent No.: US 11,226,350 B2
(45) Date of Patent: Jan. 18, 2022

(54) METHOD AND DEVICE FOR DETECTING OBSTACLE SPEED, COMPUTER DEVICE, AND STORAGE MEDIUM

(71) Applicant: BAIDU ONLINE NETWORK TECHNOLOGY (BEIJING) CO., LTD., Beijing (CN)

(72) Inventor: Kai Cheng, Beijing (CN)

(73) Assignee: Apollo Intelligent Driving Technology (Beijing) Co., Ltd., Beijiing (CN)

( * ) Notice: Subject to any disclaimer, the term of this patent is extended or adjusted under 35 U.S.C. 154(b) by 343 days.

(21) Appl. No.: 16/562,043

(22) Filed: Sep. 5, 2019

(65) Prior Publication Data
US 2020/0081024 A1 Mar. 12, 2020

(30) Foreign Application Priority Data
Sep. 7, 2018 (CN) .......................... 201811042577.3

(51) Int. Cl.
*G01P 3/64* (2006.01)
*G06T 7/254* (2017.01)
(Continued)

(52) U.S. Cl.
CPC ................ *G01P 3/64* (2013.01); *G06T 7/254* (2017.01); *G06T 7/97* (2017.01); *G01S 13/58* (2013.01);
(Continued)

(58) Field of Classification Search
CPC ... G01P 3/64; G06T 7/254; G06T 7/97; G06T 2207/10016; G06T 2207/30261; G01S 13/58; G01S 17/58
(Continued)

(56) References Cited

U.S. PATENT DOCUMENTS

| | | | | |
|---|---|---|---|---|
| 2014/0032012 A1* | 1/2014 | Joshi | ................... | G05D 1/0274 701/1 |
| 2015/0063647 A1* | 3/2015 | Ryu | ....................... | G06T 7/215 382/104 |
| 2016/0062361 A1* | 3/2016 | Nakano | ................. | G05D 1/024 701/25 |

FOREIGN PATENT DOCUMENTS

| | | |
|---|---|---|
| JP | H10206442 A | 8/1998 |
| JP | 2006268097 A | 10/2006 |

(Continued)

OTHER PUBLICATIONS

European Patent Application No. 19195686.1, extended Search and Opinion dated Dec. 6, 2019, 10 pages.
(Continued)

*Primary Examiner* — Allen C Wong
(74) *Attorney, Agent, or Firm* — Lathrop GPM LLP

(57) ABSTRACT

Embodiments of the present disclosure provide a method and device for detecting a speed of an obstacle, a computer device, and a storage medium. The method includes: calculating at least two real-time speeds corresponding to the obstacle by using a multi-frame difference algorithm according to multi-frame data acquired by a sensor in a preset time window; calculating at least two speed statistic values corresponding to the obstacle according to the at least two real-time speeds; mapping each of the at least two speed statistic values to a corresponding static probability according to a mapping relationship between speed statistic values and static probabilities, to obtain at least two static probabilities; and fusing the at least two static probabilities to obtain a fused static probability of the obstacle, and determining the speed of the obstacle according to the fused static probability.

18 Claims, 3 Drawing Sheets

(51) Int. Cl.
  *G06T 7/00* (2017.01)
  *G01S 17/58* (2006.01)
  *G01S 13/58* (2006.01)
(52) U.S. Cl.
  CPC ..... *G01S 17/58* (2013.01); *G06T 2207/10016* (2013.01); *G06T 2207/30261* (2013.01)
(58) Field of Classification Search
  USPC ....................................................... 702/149
  See application file for complete search history.

(56) References Cited

FOREIGN PATENT DOCUMENTS

JP           H5314262 B2      10/2013
JP           WO2018011964 A1   8/2018

OTHER PUBLICATIONS

Márquez-Gámez, D., et al. "Active Visual-Based Detection and Tracking of Moving Objects from Clustering and Classification Methods" Sep. 4, 2012, Advanced Concepts for Intelligent Vision Systems, pp. 361-373.

Cheng, H.. et al. "Interactive Road Situation Analysis for Driver Assistance and Safety Warning Systems: Framework and Algorithms" IEEE Transactions On Intelligent Transportation Systems, vol. 8, No. 1, Mar. 2007, pp. 157-167.

Chinese Patent Application No. 201811042577.3, First Office Action dated Jul. 3, 2020, 4 pages.

Japanese Patent Application No. 2019162146, First Office Action dated Aug. 4, 2020, 2 pages.

Japanese Patent Application No. 2019162146, English translation of First Office Action dated Aug. 4, 2020, 2 pages.

Zhou, D. et al. "Modified GMM background modeling and optical flow for detection of moving objects" 2005 IEEE International Conference on Systems, Man and Cybernetics, 2005, pp. 2224-2229 vol. 3, pp. 65-70.

Yang, F. et al. "Real-time dynamic obstacle detection and tracking using 3D lidar" Sep. 2012, Journal of Zhejiang University (Engineering Science) vo. 46, No. 9, 1565-1571.

Zhang, J. et al. "Obstacle detection based on Multi-feature fusion" Journal of Chongqing University of Technology(Natural Science) Mar. 2015, vol. 9 No. 3, pp.

\* cited by examiner

METHOD AND DEVICE FOR DETECTING OBSTACLE SPEED, COMPUTER DEVICE, AND STORAGE MEDIUM

CROSS-REFERENCE TO RELATED APPLICATIONS

This application claims priority to and benefits of Chinese Patent Application No. 201811042577.3, filed with the National Intellectual Property Administration of P. R. China on Sep. 7, 2018, the entire contents of which are incorporated herein by reference.

TECHNICAL FIELD

The present disclosure relates to the field of data processing technologies, and more particularly, to a method and device for detecting a speed of an obstacle, a computer device, and a storage medium.

BACKGROUND

Recently, with the continuous development of sensor technology, control system and artificial intelligence technology, unmanned vehicles and ground mobile robots have made great progress. Taking the unmanned vehicle as an example, in real dynamic environments, the unmanned vehicle needs to be able to stably and accurately detect the obstacle and recognize the speed of the obstacle, which can help to establish a motion model for path planning, and assist the unmanned vehicle to make various intelligent decision-making behaviors.

In the related art, the speed information of the obstacle is calculated by a single frame difference method, and then the static state of the obstacle is determined by a speed threshold. However, the above manner is susceptible to the sensor noise interference, and there is a problem of speed threshold selection, and if the selected speed threshold is unsuitable, the low speed cannot be reported, or a false speed may be reported, resulting in poor stability and safety.

SUMMARY

According to a first aspect, embodiments of the present disclosure provide a method for detecting a speed of an obstacle. The method includes: calculating at least two real-time speeds corresponding to the obstacle by using a multi-frame difference algorithm according to multi-frame data acquired by a sensor in a preset time window; calculating at least two speed statistic values corresponding to the obstacle according to the at least two real-time speeds; mapping each of the at least two speed statistic values to a corresponding static probability according to a mapping relationship between speed statistic values and static probabilities, to obtain at least two static probabilities; and fusing the at least two static probabilities to obtain a fused static probability of the obstacle, and determining the speed of the obstacle according to the fused static probability.

According to a second aspect, embodiments of the present disclosure provide a computer device. The computer device includes one or more processors, and a storage device configured to store one or more programs. When the one or more programs are executed by the one or more processors, the one or more processors are caused to implement the method for detecting a speed of an obstacle according to any embodiment of the present disclosure.

According to a third aspect, embodiments of the present disclosure provide a computer storage medium having stored thereon a computer program that, when executed by a processor, causes the method for detecting a speed of an obstacle according to any embodiment of the present disclosure to be implemented.

According to a fourth aspect, embodiments of the present disclosure provide a vehicle. The vehicle includes a vehicle body, a computer device according to an embodiment of the present disclosure, and a sensor disposed on the vehicle body. The sensor is configured to detect a real-time speed of an obstacle in an ambient environment.

DETAILED DESCRIPTION

Figure 1:
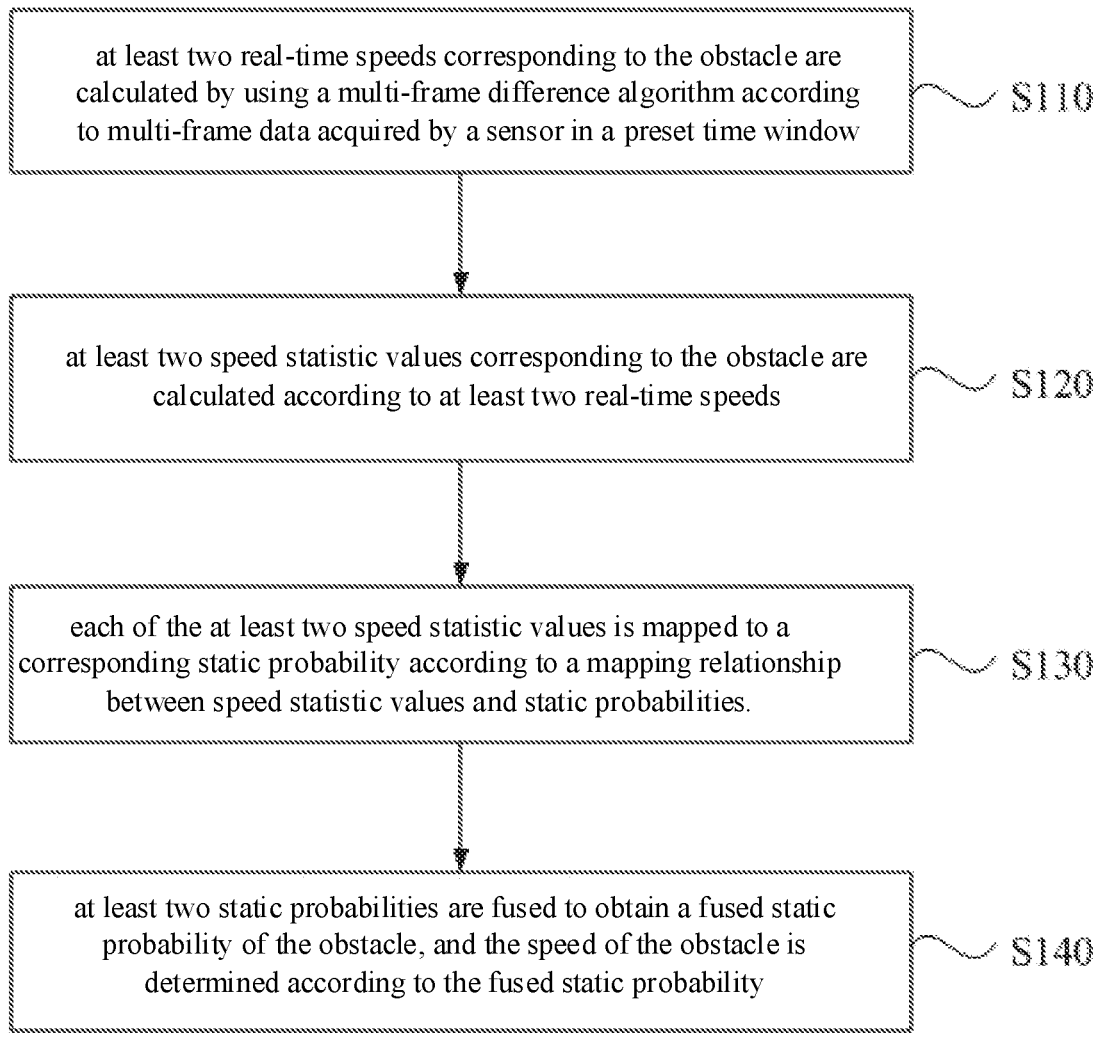
FIG. 1 is a flow chart of a method for detecting a speed of an obstacle according to Embodiment 1 of the present disclosure.

The present disclosure will be described in detail below with reference to the accompanying drawings and the embodiments. Embodiments described herein with reference to drawings are explanatory, serve to explain the present disclosure, and are not construed to limit the present disclosure.

For convenience of description, only part but not all contents related to the present disclosure are illustrated in the accompanying drawings. It should be noted that, some exemplary embodiments are described as processes or methods depicted as flowcharts. Although the flowcharts describe various operations (or steps) as a sequential process, many of the operations can be implemented in parallel, concurrently or simultaneously. In addition, the orders of the various operations can be rearranged. The process may be terminated when the operation is completed. Additional steps not shown in the drawings may also be included.

The processing may include methods, functions, procedures, subroutines, subprograms, and the like.

Embodiment 1

At present, in the unmanned vehicle system, it is important to detect the speed of the obstacle, and the detection result of the obstacle speed can provide important information for subsequent prediction and decision control. The speed detection of the obstacle with a low speed is a difficult problem in the speed detection algorithm of the unmanned vehicle system, and the safety of driving can be greatly improved if the speed information of the obstacle with the low speed can be stably and accurately reported.

FIG. 1 is a flow chart of a method for detecting a speed of an obstacle according to Embodiment 1 of the present disclosure. The embodiment may be applicable to the case where the unmanned vehicle system detects the speed of the obstacle. The method may be performed by a device for detecting a speed of an obstacle, and the device may be implemented by means of software and/or hardware, and can generally be integrated into a computer device. As shown in FIG. 1, the method includes the following operations.

At block S110, at least two real-time speeds corresponding to the obstacle are calculated by using a multi-frame difference algorithm according to multi-frame data acquired by a sensor in a preset time window.

The preset time window may be a time length for collecting obstacle data, and can be set according to practical requirements. For example, the preset time window may be 30 seconds or 1 minute. The obstacle data may be a video image or the like that can reflect the motion condition of the obstacle, which is not limited. The multi-frame difference algorithm is configured to detect a moving target, and is a technology that is extended based on inter-frame difference technology. The inter-frame difference technology is a method for obtaining the contour of a moving target by performing a difference operation on adjacent two frames in a video image sequence, and the multi-frame difference technology is a method for obtaining the contour of a moving target by performing a difference operation on two frames separated by a preset number in a video image sequence. The preset number may be 3, 4, or 5, which is not limited in the present disclosure. The real-time speed may be the speed of the obstacle at a certain time point.

In an embodiment of the present disclosure, when the obstacle data is acquired by a sensor, the corresponding preset time window needs to meet the data acquisition condition, for the acquired data may be analyzed by the multi-frame difference technology. For example, when adjacent 5 frames are required to perform the difference operation, and then at least 6 frames of images need to be acquired within the preset time window, such that at least two real-time speed corresponding to the obstacle can be calculated using the multi-frame difference technology.

At block S120, at least two speed statistic values corresponding to the obstacle are calculated according to at least two real-time speeds.

The speed statistic value may be related data calculated according to the real-time speed of the obstacle. In an embodiment of the present disclosure, the type of the speed statistic value may include a variance of speed modulus, a mean value of speed angle difference, and a second-order variance of the speed modulus. The variance of speed modulus may be calculated based on the modulus of all real-time speeds of the obstacle. The speed angle difference may be a difference between the included angles of adjacent two real-time speeds. The second-order variance of speed modulus may be calculated based on the modulus of all real-time speeds of the obstacle.

In an embodiment of the present disclosure, at least two speed statistic values corresponding to the obstacle may be calculated according to the real-time speed of the obstacle. Optionally, the variance of speed modulus, the mean value of speed angle difference, and the second-order variance of the speed modulus may be considered as different speed statistic values. The speed statistic value may be configured to calculate the static probability corresponding to the obstacle.

At block S130, each of the at least two speed statistic values is mapped to a corresponding static probability according to a mapping relationship between speed statistic values and static probabilities.

The static probability may be a probability that the obstacle is in a static state. Accordingly, the static probability corresponding to each speed statistic value can be calculated based on the mapping relationship between speed statistic values and static probabilities.

In an embodiment of the present disclosure, the mapping relationship between speed statistic values and static probabilities may include:

$$P = \begin{cases} 0, & v < t \\ 1 - e^{-\left(\frac{v-t}{s}\right)^2}, & v \geq t \end{cases}$$

where v is the speed statistic value, P is the static probability, and t and s are preset mapping parameters.

In an embodiment, v may be an independent variable, t and s may be constants, and the values can be set according to actual needs, which is not limited in the present disclosure.

In an embodiment, t may be a statistic threshold, when v is less than t, the static probability is 0, indicating that the obstacle is currently in a non-static state, when v is greater than or equal to t, the static probability increases with the increase of v, indicating that the probability that the obstacle is in the static state increases, s may be a ratio that controls the increase of the static probability with the speed statistic value, the smaller the s is, the faster the static probability increases with the speed statistic value.

In an embodiment of the present disclosure, different mapping parameters are assigned to different speed statistic values. The preset mapping parameter t corresponding to the variance of the speed modulus>the preset mapping parameter t corresponding to the mean value of the speed angle difference>the preset mapping parameter t corresponding to the second-order variance of the speed modulus. The speed statistic value v corresponding to the variance of speed modulus>the speed statistic value v corresponding to the mean value of the speed angle difference>the speed statistic value v corresponding to the second-order variance of the speed modulus.

The set values of t and s corresponding to the variance of the speed modulus are the largest, the set values of t and s corresponding to the mean value of the speed angle difference are the second, and the set values of t and s corresponding to the second-order variance of the speed modulus are the smallest.

At block S140, at least two static probabilities are fused to obtain a fused static probability of the obstacle, and the speed of the obstacle is determined according to the fused static probability.

In an embodiment of the present disclosure, fusing the at least two static probabilities to obtain the fused static probability of the obstacle may include: calculating the fused static probability $P_{final}$ of the obstacle by $$P_{final} = \frac{e^{-\Sigma logit(P_i)}}{1 + e^{-\Sigma logit(P_i)}}, i \in [2, N], \text{ where } logit(P_i) = \log\frac{P_i}{1 - P_i},$$

N denotes a number of the static probabilities, and $P_i$ denotes the static probability corresponding to the $i^{th}$ speed statistic value.

The fused static probability may be obtained by fusing the static probabilities of the obstacle corresponding to the different speed statistic values according to a preset rule.

Correspondingly, in an embodiment of the present disclosure, after the static probabilities of the obstacle corresponding to different speed statistic values are acquired, the fused static probability $P_{final}$ of the obstacle can be calculated by the above formula. It should be noted that, in the above formula, the weight of the static probability corresponding to each speed statistic value is the same.

In an embodiment of the present disclosure, determining the speed of the obstacle according to the fused static probability may include: comparing the fused static probability with a probability threshold; determining that the obstacle is in a static state in response to determining that the fused static probability is greater than or equal to the probability threshold; and determining the real-time speed as the speed of the obstacle in response to determining that the fused static probability is less than the probability threshold.

The probability threshold may be a probability value for determining the static state of the obstacle, and its value can be set according to actual requirements, which is not limited in the present disclosure.

In an embodiment of the present disclosure, after the fused static probability of the obstacle is obtained, the fused static probability may be compared with the probability threshold to determine the speed of the obstacle. Specifically, when the fused static probability is greater than or equal to the probability threshold, it can be determined that the obstacle is still, and when the fused static probability is less than the probability threshold, the real-time speed may be determined as the speed of the obstacle. It should be noted that, in the embodiment, the probability threshold is different from the speed threshold in the related art, the probability that the obstacle is still is considered, rather than the comparison of the obstacle speed, such that the speed detection result of the obstacle can be more accurately determined.

According to embodiments of the present disclosure, at least two real-time speeds corresponding to the obstacle are calculated by using a multi-frame difference algorithm according to multi-frame data acquired by a sensor in a preset time window, at least two speed statistic values corresponding to the obstacle are calculated according to the at least two real-time speeds, each of the at least two speed statistic values is mapped to a corresponding static probability according to a mapping relationship between speed statistic values and static probabilities, and the at least two static probabilities are fused to obtain a fused static probability of the obstacle, and the speed of the obstacle is determined according to the fused static probability. Thereby, the speed of the obstacle can be detected based on a plurality of real-time speeds of the obstacle, the problem of poor stability and safety of the unmanned vehicle system in performing speed detection of obstacles with a low speed can be solved, and the stability, reliability and accuracy of the unmanned vehicle system in detecting the obstacle speed can be improved.

Embodiment 2

Figure 2:
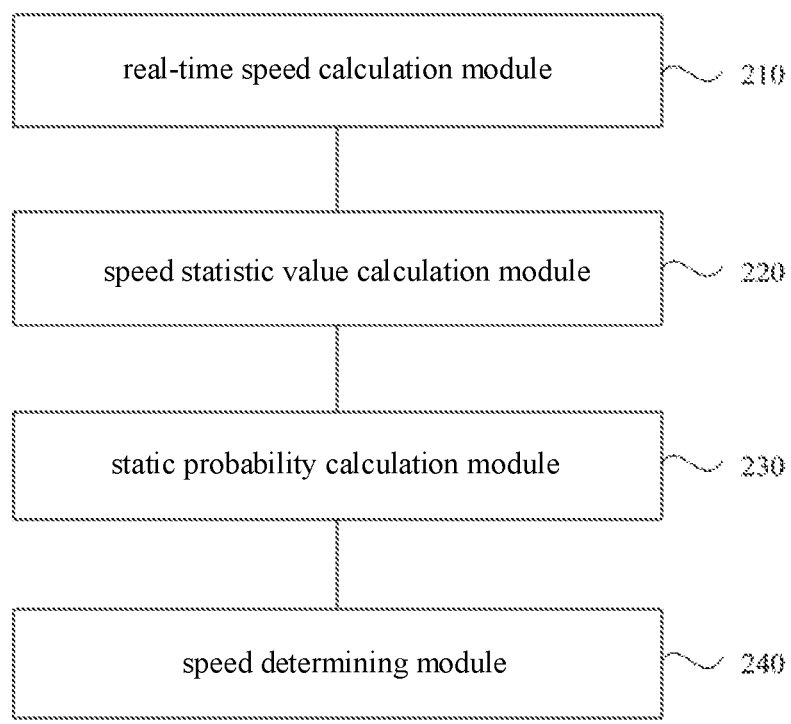
FIG. 2 is a schematic diagram of a device for detecting a speed of an obstacle according to Embodiment 2 of the present disclosure.

FIG. 2 is a schematic diagram of a device for detecting a speed of an obstacle according to Embodiment 2 of the present disclosure. The device includes a real-time speed calculation module 210, a speed statistic value calculation module 220, a static probability calculation module 230, and a speed determining module 240.

The real-time speed calculation module 210 is configured to calculate at least two real-time speeds corresponding to the obstacle by using a multi-frame difference algorithm according to multi-frame data acquired by a sensor in a preset time window.

The speed statistic value calculation module 220 is configured to calculate at least two speed statistic values corresponding to the obstacle according to the at least two real-time speeds.

The static probability calculation module 230 is configured to map each of the at least two speed statistic values to a corresponding static probability according to a mapping relationship between speed statistic values and static probabilities, to obtain at least two static probabilities.

The speed determining module 240 is configured to fuse the at least two static probabilities to obtain a fused static probability of the obstacle, and determine the speed of the obstacle according to the fused static probability.

According to embodiments of the present disclosure, at least two real-time speeds corresponding to the obstacle are calculated by using a multi-frame difference algorithm according to multi-frame data acquired by a sensor in a preset time window, at least two speed statistic values corresponding to the obstacle are calculated according to the at least two real-time speeds, each of the at least two speed statistic values is mapped to a corresponding static probability according to a mapping relationship between speed statistic values and static probabilities, and the at least two static probabilities are fused to obtain a fused static probability of the obstacle, and the speed of the obstacle is determined according to the fused static probability. Thereby, the speed of the obstacle can be detected based on a plurality of real-time speeds of the obstacle, the problem of poor stability and safety of the unmanned vehicle system in performing speed detection of obstacles with a low speed can be solved, and the stability, reliability and accuracy of the unmanned vehicle system in detecting the obstacle speed can be improved.

In at least one embodiment, the speed statistic value may include a variance of speed modulus, a mean value of speed angle difference, and a second-order variance of the speed modulus.

In at least one embodiment, the mapping relationship between speed statistic values and static probabilities includes:

$$P = \begin{cases} 0, & v < t \\ 1 - e^{-\left(\frac{v-t}{s}\right)^2}, & v \geq t \end{cases}$$

where v denotes the speed statistic value, P denotes the static probability, and t and s denote preset mapping parameters.

In at least one embodiment, different mapping parameters are assigned to different speed statistic values. The preset mapping parameter t corresponding to the variance of the speed modulus is greater than the preset mapping parameter t corresponding to the mean value of the speed angle difference, and the preset mapping parameter t corresponding to the mean value of the speed angle difference is greater than the preset mapping parameter t corresponding to the second-order variance of the speed modulus. The speed statistic value v corresponding to the variance of speed modulus is greater than the speed statistic value v corresponding to the mean value of the speed angle difference, and the speed statistic value v corresponding to the mean value of the speed angle difference is greater than the speed statistic value v corresponding to the second-order variance of the speed modulus.

In at least one embodiment, the speed determining module 240 is configured to calculate the fused static probability $P_{final}$ of the obstacle by $$P_{final} = \frac{e^{-\Sigma logit(P_i)}}{1 + e^{-\Sigma logit(P_i)}}, i \in [2, N], \text{ where } logit(P_i) = \log\frac{P_i}{1-P_i},$$

N denotes the number of the static probabilities, and $P_i$ denotes the static probability corresponding to the $i^{th}$ speed statistic value.

In at least one embodiment, the speed determining module 240 is further configured to compare the fused static probability with a probability threshold, and determine that the obstacle is in a static state in response to determining that the fused static probability is greater than or equal to the probability threshold, and determine the real-time speed as the speed of the obstacle in response to determining that the fused static probability is less than the probability threshold.

The above device may be configured to perform the method for detecting a speed of an obstacle according to any embodiment of the present disclosure, and has the corresponding functional modules for executing the method, and can achieve corresponding beneficial effects. For technical details that are not described in the embodiment, reference may be made to the method for detecting the speed of an obstacle provided by any embodiment of the present disclosure.

Embodiment 3

Figure 3:
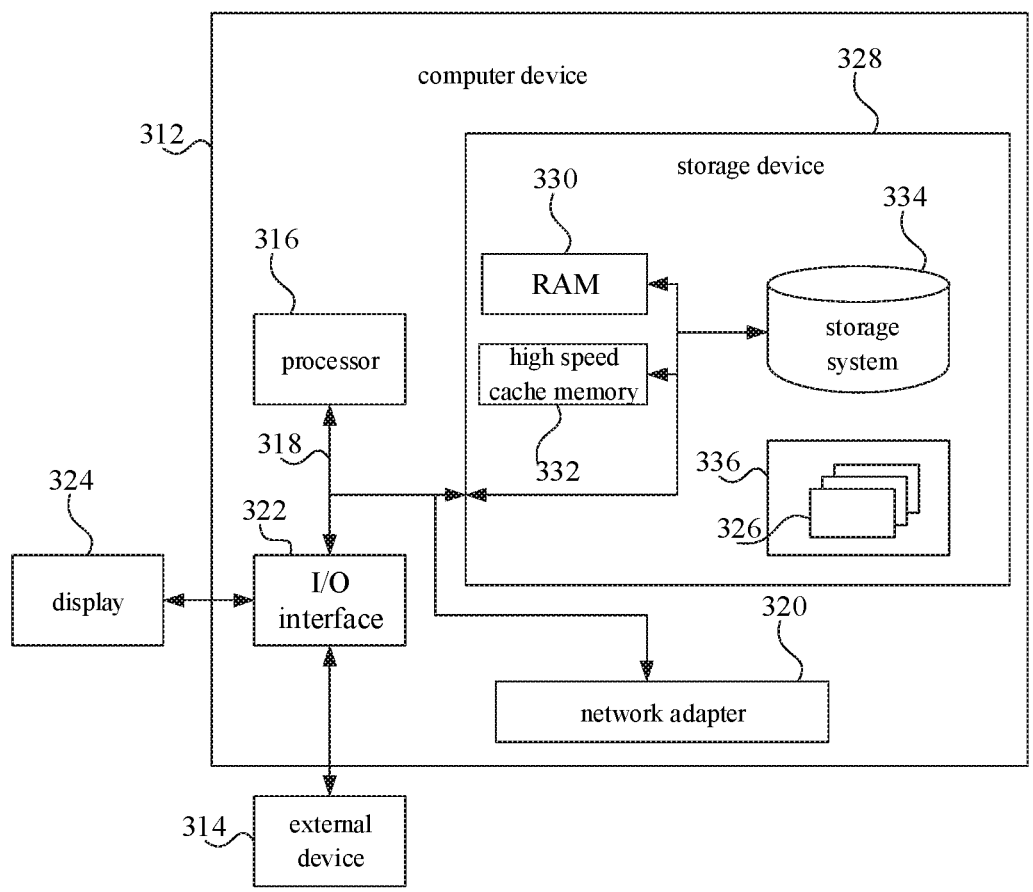
FIG. 3 is a schematic diagram of a computer device according to Embodiment 3 of the present disclosure.

FIG. 3 is a schematic diagram of a computer device according to Embodiment 3 of the present disclosure. FIG. 3 is a block diagram of a computer device 312 suitable for implementing embodiments of the present disclosure. The computer device 312 shown in FIG. 3 is merely an example, and should not impose any limitation to the functions and scopes of embodiments of the present disclosure.

As shown in FIG. 3, the computer device 312 may be embodied in the form of a general-purpose computing device. Components of the computer device 312 may include, but are not limited to, one or more processors 316, a storage device 328, and a bus 318 that connects different components (including the storage device 328 and the processor 316).

The bus 318 represents one or more of any of several types of bus structures, including a memory bus or a memory controller, a peripheral bus, an accelerated graphics port, a processor, or a local bus using any of a variety of bus structures. For example, these architectures include, but are not limited to, an Industry Standard Architecture (hereinafter referred to as ISA) bus, a Micro Channel Architecture (hereinafter referred to as MAC) bus, an enhanced ISA bus, a Video Electronics Standards Association (hereinafter referred to as VESA) local bus and Peripheral Component Interconnection (PCI) bus.

The computer device 312 typically includes a variety of computer system readable media. These media may be any available media accessible by the computer device 12, including volatile and non-volatile media, removable and non-removable media.

The storage device 328 may include a computer system readable medium in the form of volatile memory, such as a random-access memory (hereinafter referred to as RAM) 330 and/or a high-speed cache memory 332. The computer device 312 may further include other removable or non-removable, volatile or non-volatile computer system storage medium. By way of example only, the storage system 334 may be configured to read and write non-removable and non-volatile magnetic media (not shown in FIG. 3, commonly referred to as a "hard drive"). Although not shown in FIG. 3, a magnetic disk driver for reading from and writing to a removable and non-volatile magnetic disk (such as "floppy disk") and a disk driver for reading from and writing to a removable and non-volatile optical disk (such as compact disk read only memory (hereinafter referred to as CD-ROM), a digital video disc read only memory (hereinafter referred to as DVD-ROM) or other optical media can be provided. In these cases, each driver may be connected to the bus 318 via one or more data medium interfaces. The storage device 328 may include at least one program product. The program product has a set of (such as, at least one) program modules configured to perform the functions of various embodiments of the present disclosure.

A program 336 having a set of (at least one) the program modules 326 may be stored in, for example, the storage device 328. The program module 326 may include, but is not limited to, an operating system, one or more application programs, other programs modules and program data. Each of these examples, or some combination thereof, may include an implementation of a network environment. The program module 326 is generally configured to perform functions and/or methods in embodiments of the present disclosure.

The computer device 312 may also communicate with one or more external devices 314 (e.g., a keyboard, a pointing device, a camera, a display 324). Furthermore, the computer device 312 may also communicate with one or more devices enabling a user to interact with the computer device 312 and/or other devices (such as a network card, a modem, etc.) enabling the computer device 312 to communicate with one or more computer devices. This communication can be performed via the input/output (I/O) interface 322. Also, the computer device 312 may communicate with one or more networks (such as a local area network (hereafter referred to as LAN), a wide area network (hereafter referred to as WAN) and/or a public network such as the Internet) through a network adapter 320. As shown in FIG. 3, the network adapter 320 communicates with other modules of the computer device 312 over the bus 318. It should be understood that, although not shown in FIG. 3, other hardware and/or software modules may be used in conjunction with the computer device 312, which include, but are not limited to, microcode, device drivers, redundant processing units, external disk drive arrays, RAID systems, tape drives, as well as data backup storage systems and the like.

The processor 316 is configured to execute various functional applications and data processing by running a program stored in the storage device 328, for example, to implement the method for detecting a speed of an obstacle provided by the above-described embodiments of the present disclosure.

When the processing unit executes the program, the following acts can be implemented, including: calculating at least two real-time speeds corresponding to the obstacle by using a multi-frame difference algorithm according to multi-frame data acquired by a sensor in a preset time window; calculating at least two speed statistic values corresponding to the obstacle according to the at least two real-time speeds; mapping each of the at least two speed statistic values to a corresponding static probability according to a mapping relationship between speed statistic values and static probabilities, to obtain at least two static probabilities; and fusing the at least two static probabilities to obtain a fused static probability of the obstacle, and determining the speed of the obstacle according to the fused static probability.

By the computer device, at least two real-time speeds corresponding to the obstacle are calculated by using a multi-frame difference algorithm according to multi-frame data acquired by a sensor in a preset time window, at least two speed statistic values corresponding to the obstacle are calculated according to the at least two real-time speeds, each of the at least two speed statistic values is mapped to a corresponding static probability according to a mapping relationship between speed statistic values and static probabilities, and the at least two static probabilities are fused to obtain a fused static probability of the obstacle, and the speed of the obstacle is determined according to the fused static probability. Thereby, the speed of the obstacle can be detected based on a plurality of real-time speeds of the obstacle, the problem of poor stability and safety of the unmanned vehicle system in performing speed detection of obstacles with a low speed can be solved, and the stability, reliability and accuracy of the unmanned vehicle system in detecting the obstacle speed can be improved.

Embodiment 4

Embodiment 4 of the present disclosure further provides a computer storage medium having stored thereon a computer program that, when executed by a processor, causes the method for detecting a speed of an obstacle according to any embodiment of the present disclosure to be implemented. The method includes: calculating at least two real-time speeds corresponding to the obstacle by using a multi-frame difference algorithm according to multi-frame data acquired by a sensor in a preset time window; calculating at least two speed statistic values corresponding to the obstacle according to the at least two real-time speeds; mapping each of the at least two speed statistic values to a corresponding static probability according to a mapping relationship between speed statistic values and static probabilities, to obtain at least two static probabilities; and fusing the at least two static probabilities to obtain a fused static probability of the obstacle, and determining the speed of the obstacle according to the fused static probability.

The above non-transitory computer readable storage medium may adopt any combination of one or more computer readable medium(s). The computer readable medium may be a computer readable signal medium or a computer readable storage medium. The computer readable storage medium may be, but is not limited to, for example, an electrical, magnetic, optical, electromagnetic, infrared, or semiconductor system, apparatus, device, component or any combination thereof. More specific examples (a non-exhaustive list) of the computer readable storage medium include: an electrical connection having one or more wires, a portable computer disk, a hard disk, a random access memory (RAM), a read only memory (ROM), an Erasable Programmable Read Only Memory (EPROM) or a flash memory, an optical fiber, a compact disc read-only memory (CD-ROM), an optical memory component, a magnetic memory component, or any suitable combination thereof. In context, the computer readable storage medium may be any tangible medium including or storing programs. The programs may be used by or in connection with an instruction executed system, apparatus or device.

The computer readable signal medium may include a data signal propagating in baseband or as part of carrier wave, which carries computer readable program codes. Such propagated data signal may take any of a variety of forms, including but not limited to an electromagnetic signal, an optical signal, or any suitable combination thereof. The computer readable signal medium may also be any computer readable medium other than the computer readable storage medium, which may send, propagate, or transport programs used by or in connection with an instruction executed system, apparatus or device.

The program code stored on the computer readable medium may be transmitted using any appropriate medium, including but not limited to wireless, wireline, optical fiber cable, RF, or any suitable combination thereof.

The computer program code for carrying out operations of embodiments of the present disclosure may be written in one or more programming languages. The programming language includes an object-oriented programming language, such as Java, Smalltalk, C++, as well as conventional procedural programming language, such as "C" language or similar programming language. The program code may be executed entirely on a user's computer, partly on the user's computer, as a separate software package, partly on the user's computer, partly on a remote computer, or entirely on the remote computer or server. In a case of the remote computer, the remote computer may be connected to the user's computer or an external computer (such as using an Internet service provider to connect over the Internet) through any kind of network, including a Local Area Network (hereafter referred as to LAN) or a Wide Area Network (hereafter referred as to WAN).

Embodiment 5

On the basis of the above embodiments, embodiments of the present disclosure further provide a vehicle. The vehicle includes a vehicle body, a computer device according to an embodiment of the present disclosure, and a sensor disposed on the vehicle body. The sensor is configured to detect a real-time speed of an obstacle in an ambient environment.

In an embodiment, the sensor may include a millimeter wave radar or a laser radar.

The above are only the preferred embodiments of the present disclosure and the technical principles applied thereto. Those skilled in the art will appreciate that the present disclosure is not limited to the specific embodiments described herein, and that various modifications, changes and substitutions may be made without departing from the scope of the present disclosure. Although the present disclosure has been described in detail by the above embodiments, the present disclosure is not limited to the above embodiments, and other equivalent embodiments may be included without departing from the scope of the present disclosure, and the scope of the present disclosure is determined by the scope of the appended claims.

What is claimed is:

1. A method for detecting a speed of an obstacle, comprising:
   calculating at least two real-time speeds corresponding to the obstacle by using a multi-frame difference algorithm according to multi-frame data acquired by a sensor in a preset time window;
   calculating at least two speed statistic values corresponding to the obstacle according to the at least two real-time speeds;
   mapping each of the at least two speed statistic values to a corresponding static probability according to a mapping relationship between speed statistic values and static probabilities, to obtain at least two static probabilities; and fusing the at least two static probabilities to obtain a fused static probability of the obstacle, and determining the speed of the obstacle according to the fused static probability.

2. The method according to claim 1, wherein the at least two speed statistic values comprise: a variance of speed modulus, a mean value of speed angle difference, and a second-order variance of the speed modulus.

3. The method according to claim 2, wherein fusing the at least two static probabilities to obtain the fused static probability of the obstacle comprises:

calculating the fused static probability $P_{final}$ of the obstacle by:

$$P_{final} = \frac{e^{-\Sigma logit(P_i)}}{1 + e^{-\Sigma logit(P_i)}}, i \in [2, N], \text{ where } logit(P_i) = \log\frac{P_i}{1 - P_i},$$

N denotes a number of the static probabilities, and $P_i$ denotes the static probability corresponding to the $i^{th}$ speed statistic value.

4. The method according to claim 1, wherein the mapping relationship between speed statistic values and static probabilities comprises:

$$P = \begin{cases} 0, & v < t \\ 1 - e^{-\left(\frac{v-t}{s}\right)^2}, & v \geq t \end{cases}$$

where v denotes the speed statistic value, P denotes the static probability, and t and s denote preset mapping parameters.

5. The method according to claim 4, wherein different mapping parameters are assigned to different speed statistic values;

wherein the preset mapping parameter t corresponding to the variance of the speed modulus is greater than the preset mapping parameter t corresponding to the mean value of the speed angle difference, and the preset mapping parameter t corresponding to the mean value of the speed angle difference is greater than the preset mapping parameter t corresponding to the second-order variance of the speed modulus;

the speed statistic value v corresponding to the variance of speed modulus is greater than the speed statistic value v corresponding to the mean value of the speed angle difference, and the speed statistic value v corresponding to the mean value of the speed angle difference is greater than the speed statistic value v corresponding to the second-order variance of the speed modulus.

6. The method according to claim 1, wherein determining the speed of the obstacle according to the fused static probability comprises:

comparing the fused static probability with a probability threshold;

determining that the obstacle is in a static state in response to determining that the fused static probability is greater than or equal to the probability threshold;

determining the real-time speed as the speed of the obstacle in response to that the fused static probability is less than the probability threshold.

7. A device for detecting a speed of an obstacle, comprising:

one or more processors;

a storage device, configured to store one or more programs, wherein when the one or more programs are executed by the one or more processors, the one or more processors are caused to:

calculate at least two real-time speeds corresponding to the obstacle by using a multi-frame difference algorithm according to multi-frame data acquired by a sensor in a preset time window;

calculate at least two speed statistic values corresponding to the obstacle according to the at least two real-time speeds;

map each of the at least two speed statistic values to a corresponding static probability according to a mapping relationship between speed statistic values and static probabilities, to obtain at least two static probabilities; and fuse the at least two static probabilities to obtain a fused static probability of the obstacle, and determine the speed of the obstacle according to the fused static probability.

8. The device according to claim 7, wherein the at least two speed statistic values comprise: a variance of speed modulus, a mean value of speed angle difference, and a second-order variance of the speed modulus.

9. The device according to claim 8, wherein in fusing the at least two static probabilities to obtain the fused static probability of the obstacle, the one or more processors are configured to:

calculate the fused static probability $P_{final}$ of the obstacle by:

$$P_{final} = \frac{e^{-\Sigma logit(P_i)}}{1 + e^{-\Sigma logit(P_i)}}, i \in [2, N], \text{ where } logit(P_i) = \log\frac{P_i}{1 - P_i},$$

N denotes a number of the static probabilities, and $P_i$ denotes the static probability corresponding to the $i^{th}$ speed statistic value.

10. The device according to claim 7, wherein the mapping relationship between speed statistic values and static probabilities comprises:

$$P = \begin{cases} 0, & v < t \\ 1 - e^{-\left(\frac{v-t}{s}\right)^2}, & v \geq t \end{cases}$$

where v denotes the speed statistic value, P denotes the static probability, and t and s denote preset mapping parameters.

11. The device according to claim 10, wherein different mapping parameters are assigned to different speed statistic values;

wherein the preset mapping parameter t corresponding to the variance of the speed modulus is greater than the preset mapping parameter t corresponding to the mean value of the speed angle difference, and the preset mapping parameter t corresponding to the mean value of the speed angle difference is greater than the preset mapping parameter t corresponding to the second-order variance of the speed modulus;

the speed statistic value v corresponding to the variance of speed modulus is greater than the speed statistic value v corresponding to the mean value of the speed angle difference, and the speed statistic value v corresponding to the mean value of the speed angle difference is greater than the speed statistic value v corresponding to the second-order variance of the speed modulus.

12. The device according to claim 7, wherein in determining the speed of the obstacle according to the fused static probability, the one or more processors are configured to:
compare the fused static probability with a probability threshold;
determine that the obstacle is in a static state in response to determining that the fused static probability is greater than or equal to the probability threshold; and
determine the real-time speed as the speed of the obstacle in response to determining that the fused static probability is less than the probability threshold.

13. A non-transitory computer storage medium having stored thereon a computer program that, when executed by a processor, causes a method for detecting a speed of an obstacle to be implemented, the method comprising:
calculating at least two real-time speeds corresponding to the obstacle by using a multi-frame difference algorithm according to multi-frame data acquired by a sensor in a preset time window;
calculating at least two speed statistic values corresponding to the obstacle according to the at least two real-time speeds;
mapping each of the at least two speed statistic values to a corresponding static probability according to a mapping relationship between speed statistic values and static probabilities, to obtain at least two static probabilities; and
fusing the at least two static probabilities to obtain a fused static probability of the obstacle, and determining the speed of the obstacle according to the fused static probability.

14. The non-transitory computer storage medium according to claim 13, wherein the at least two speed statistic values comprise: a variance of speed modulus, a mean value of speed angle difference, and a second-order variance of the speed modulus.

15. The non-transitory computer storage medium according to claim 14, wherein fusing the at least two static probabilities to obtain the fused static probability of the obstacle comprises:
calculating the fused static probability $P_{final}$ of the obstacle by:

$$P_{final} = \frac{e^{-\Sigma logit(P_i)}}{1 + e^{-\Sigma logit(P_i)}}, i \in [2, N], \text{ where } logit(P_i) = \log\frac{P_i}{1 - P_i},$$

N denotes a number of the static probabilities, and $P_i$ denotes the static probability corresponding to the $i^{th}$ speed statistic value.

16. The non-transitory computer storage medium according to claim 13, wherein the mapping relationship between speed statistic values and static probabilities comprises:

$$P = \begin{cases} 0, & v < t \\ 1 - e^{-(\frac{v-t}{s})^2}, & v \geq t \end{cases}$$

where v denotes the speed statistic value, P denotes the static probability, and t and s denote preset mapping parameters.

17. The non-transitory computer storage medium according to claim 16, wherein different mapping parameters are assigned to different speed statistic values;
wherein the preset mapping parameter t corresponding to the variance of the speed modulus is greater than the preset mapping parameter t corresponding to the mean value of the speed angle difference, and the preset mapping parameter t corresponding to the mean value of the speed angle difference is greater than the preset mapping parameter t corresponding to the second-order variance of the speed modulus;
the speed statistic value v corresponding to the variance of speed modulus is greater than the speed statistic value v corresponding to the mean value of the speed angle difference, and the speed statistic value v corresponding to the mean value of the speed angle difference is greater than the speed statistic value v corresponding to the second-order variance of the speed modulus.

18. The non-transitory computer storage medium according to claim 13, wherein determining the speed of the obstacle according to the fused static probability comprises:
comparing the fused static probability with a probability threshold;
determining that the obstacle is in a static state in response to determining that the fused static probability is greater than or equal to the probability threshold; and
determining the real-time speed as the speed of the obstacle in response to determining that the fused static probability is less than the probability threshold.

* * * * *